United States Patent [19]

Kanazawa et al.

[11] Patent Number: 5,116,078
[45] Date of Patent: May 26, 1992

[54] SUSPENSION CONTROL SYSTEM COOPERATED WITH STEERING CONTROL SYSTEM FOR VEHICLE

[75] Inventors: Hirotaka Kanazawa, Hiroshima; Shin Takehara, Higashi-Hiroshima; Hiroshi Ohmura, Hakkaichi, all of Japan

[73] Assignee: Mazda Motor Corporation, Hiroshima, Japan

[21] Appl. No.: 608,981

[22] Filed: Nov. 5, 1990

[30] Foreign Application Priority Data

Nov. 6, 1989 [JP] Japan .................... 1-289608

[51] Int. Cl.$^5$ .................... B60G 11/26; B62D 9/02
[52] U.S. Cl. .................... 280/707; 280/772; 280/91; 364/424.05
[58] Field of Search ............ 280/707, 689, 773, 91, 280/112.2, 6.12, 772; 364/424.05; 180/140

[56] References Cited

U.S. PATENT DOCUMENTS

| 4,377,215 | 3/1983 | Hare | 280/112.2 |
| 4,797,823 | 1/1989 | Ikemoto et al. | 280/6.12 |
| 4,828,283 | 5/1989 | Ishii et al. | 364/424.05 |
| 4,830,394 | 5/1989 | Tanaka et al. | 280/707 |
| 4,921,060 | 5/1990 | Imaseki et al. | 280/707 |
| 4,922,427 | 5/1990 | Yokote et al. | 280/707 |
| 5,037,119 | 8/1991 | Takehara et al. | 280/707 |
| 5,048,633 | 9/1991 | Takehara et al. | 364/424.05 |
| 5,054,813 | 10/1991 | Kakizaki | 280/772 |

FOREIGN PATENT DOCUMENTS 0194919 8/1987 Japan .................... 280/707

*Primary Examiner*—Kenneth R. Rice
*Assistant Examiner*—Paul Dickson
*Attorney, Agent, or Firm*—Fleit, Jacobson, Cohn, Price, Holman & Stern

[57] ABSTRACT

A vehicle control system includes an active suspension mechanism for providing a rolling property of a vehicle in a cornering operation of the vehicle and a suspension control device for controlling the vehicle in accordance with the rolling property provided by the active suspension mechanism and changing from one rolling property to another. A rear wheel steering mechanism steers a rear wheel in connection with steering of a front wheel, and a steering control device controls the steering of the rear wheel in accordance with a predetermined steering property and changes the steering property for the rear wheel. One of the steering property and the rolling property is changed in synchronism with a change in the other of the steering property and the rolling property. When a reverse phase property is provided for the rear wheel as a steering property and a reverse rolling property is provided for the active suspension system, the visibility of the cornering direction and the operability are improved to accomplish an active operation property. Alternatively when a same phase property is provided for the rear wheel as a steering property, the running stability can be improved.

7 Claims, 11 Drawing Sheets

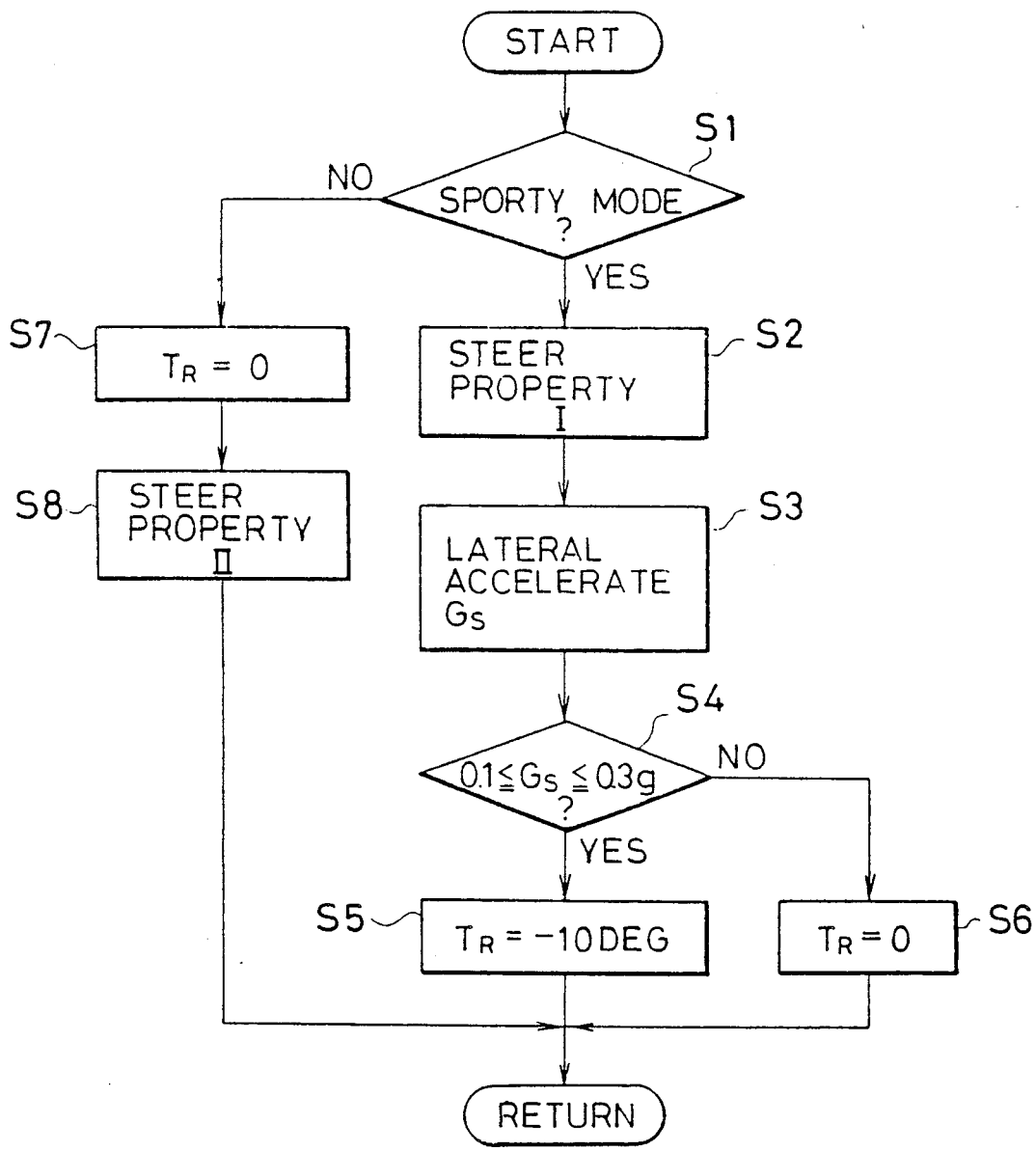

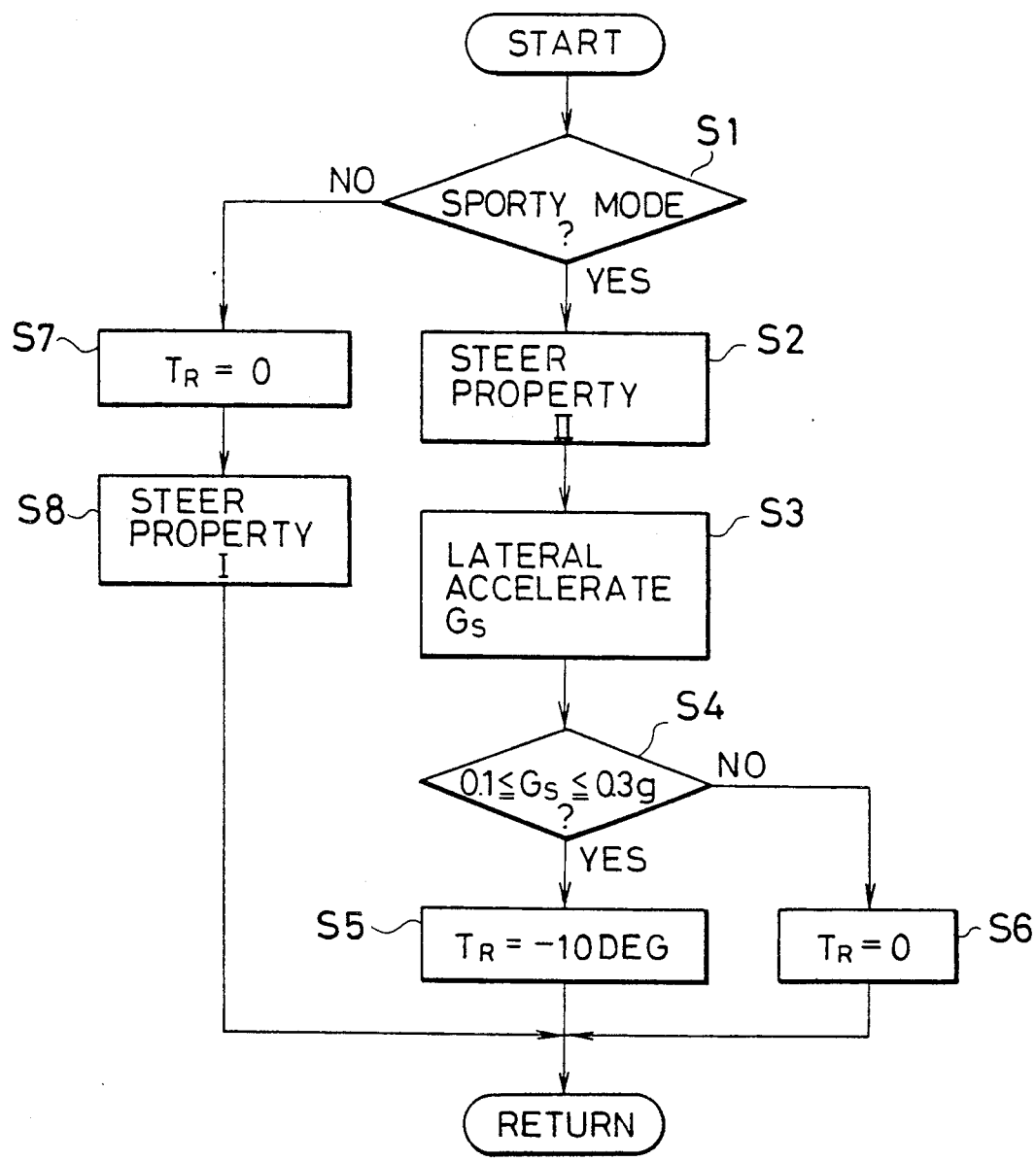

SUSPENSION CONTROL SYSTEM COOPERATED WITH STEERING CONTROL SYSTEM FOR VEHICLE

CROSS-REFERENCE TO RELATED APPLICATION

This application relates to co-pending U.S. patent application Ser. No. 485,537, which is assigned to the same assignee as the present application.

BACKGROUND OF THE INVENTION

1. Field of the Invention

This invention relates to a suspension control system cooperating with a steering control system for a vehicle, and in particular to a so called an active suspension system in cooperation with the steering control system.

2. Description of the Related

Known as a conventional suspension system, is an active suspension, disclosed in Japanese Patent Publication No. 59-14365, published for opposition in 1984, in which a cylinder device is provided for each vehicle wheel member between a vehicle body member and a vehicle wheel member. A supply of hydraulic fluid for the cylinder device is controlled to change suspension characteristics or to suppress rolling of the vehicle.

In the roll control of a vehicle utilizing such an active suspension system, it is known that the vehicle body is subjected to a reverse rolling action from the active suspension system when the vehicle is running on a curved path or is under a cornering condition. When the reverse rolling action is normally made under the cornering condition, the active suspension is controlled to negate a natural rolling movement caused by centrifugal force so as to keep a horizontal attitude of the vehicle. In another roll control, it is also known that a greater reverse rolling action is applied to the vehicle body to overcome the natural rolling movement so that the vehicle body is inclined toward a cornering center to provide the driver with a better visibility for a cornering direction. In yet another roll control, the normal and greater reverse rolling action is selectively applied automatically or manually to the vehicle body in accordance with the vehicle speed.

In a four wheel steering system, for a vehicle there has been known a rear wheel steering property which is predetermined in light of a front wheel steering property and thus, the rear wheel steering angle is automatically given in accordance with the front wheel steering angle. It is also known that the rear wheel steering property is changed. For instance, Japanese Patent Public Disclosure No. 61-220972, laid open to the public in 1987, discloses that the rear wheel steering property is changed toward a same phase property in a low vehicle speed condition so as to improve operability of the vehicle under the low speed. When the rear wheel is controlled in accordance with the same phase property, the rear wheel is steered in the same direction as that in which the front wheel is steered.

Japanese Patent Public Disclosure No. 1-202577, laid open to the public on Aug. 15, 1989, discloses a four wheel steering system with a power steering system in which the steering property for the front and rear wheels is changed when an abnormality is detected in the steering system in either the front or rear wheels.

In a vehicle provided with both the four wheel steering system and the active suspension system, the roll control is conventionally made independent from the control of the rear wheel steering property.

Thus, the controls of the four wheel steering system and the active suspension system may undesirably influence each other.

SUMMARY OF THE INVENTION

An object of this invention is, therefore, to provide an active suspension system in cooperation with a four wheel steering system to improve drivablility and/or running stability of the vehicle.

Another object of the present invention is to provide a control system for a vehicle having an active suspension system with a greater reverse rolling property and a four wheel steering system with a reverse phase property in which the rear wheel is steered in the opposite direction of the front wheel to improve the drivability and visiblity for the cornering direction, thereby providing a so-called sporty running property.

Still another object of the present invention is to provide the active suspension system with a greater reverse rolling property in cooperation with a four wheel steering system of the same phase property to improve the vehicle running stability.

In order to accomplish the above and other objects, particular vehicle, control system comprising an active suspension mechanism for providing a rolling property of a vehicle in a cornering operation of the vehicle a suspension control means for controlling the vehicle in accordance with the rolling property provided by the active suspension mechanism and for changing from one rolling property to another. A rear wheel steering mechanism is provided for steering a rear wheel in connection with steering of a front wheel, steering control means are provided for controlling the steering of the rear wheel in accordance with a predetermined steering property and for changing the steering property for the rear wheel, and property changing means are provided for changing one of the steering property and the rolling property in synchronism with a change in the other of the steering property and the rolling property.

In a preferred embodiment, the property changing means provides the rear wheel with a reverse phase steering property, in which the rear wheel begins to be steered in the opposite direction to the front wheel at a relatively low vehicle speed when the suspension control means controls the active suspension mechanism in accordance with a reverse rolling property in which the vehicle is rolled beyond a horizontal attitude of the vehicle in a direction opposite to a direction of a natural rolling produced during the cornering operation.

In another preferred embodiment, the property changing means provides the rear wheel with a same phase steering property, in which the rear wheel begins to be steered in the same direction as the front wheel as a relatively high vehicle speed when the suspension control means controls the active suspension mechanism in accordance with a reverse rolling property in which the vehicle is rolled beyond a horizontal attitude of the vehicle in a direction opposite to a direction of a natural rolling produced during the cornering operation.

In a still further embodiment, the system further comprises switching means for switching a steering property of the rear wheel between a reverse phase steering property in which the rear wheel begins to be steered in the opposite direction to the front wheel at a relatively low vehicle speed and a same phase steering property in which the rear wheel begins to be steered in the same direction as the front wheel at a relatively high vehicle speed when the suspension control means controls the active suspension mechanism in accordance with a reverse rolling property, in which the vehicle is rolled beyond a horizontal attitude of the vehicle in a direction opposite to a direction of a natural rolling produced during the cornering operation.

The switching means can be constituted by a manual switch.

In another embodiment, the property changing means provides the rear wheel with a reverse phase steering property in which the rear wheel begins to be steered in the opposite direction to the front wheel at a relatively low vehicle speed when the suspension control means controls the active suspension mechanism in accordance with a normal rolling property, in which the vehicle is rolled up to a horizontal attitude of the vehicle in a direction opposite to a direction of a natural rolling produced during the cornering operation.

In still another embodiment, the property changing means provides the rear wheel with a same phase steering property in which the rear wheel begins to be steered in the same direction as the front wheel at a relatively high vehicle speed when the suspension control means controls the active suspension mechanism in accordance with a normal rolling property, in which the vehicle is rolled up to a horizontal attitude of the vehicle in a direction opposite to a direction of a natural rolling produced during the cornering operation.

The control system may further include switching means for switching a steering property of the rear wheel between a reverse phase steering property, in which the rear wheel begins to be steered in the opposite direction to the front wheel at a relatively low vehicle speed and a same phase steering property, in which the rear wheel begins to be steered in the same direction as the front wheel at a relatively high vehicle speed when the suspension control means controls the active suspension mechanism in accordance with a normal rolling property in which the vehicle is rolled up to a horizontal attitude of the vehicle in a direction opposite to a direction of a natural rolling produced during the cornering operation.

Preferably, the active suspension mechanism controls the roll of the vehicle between the reverse and normal rolling property when a lateral acceleration acting on the vehicle ranges from 0.1 to 0.3 g.

When the reverse phase property is provided for the rear wheel as a steering property in the case where the reverse rolling property is provided for the active suspension system, the visibility of the cornering direction and the operability are improved to accomplish an active operation property. On the other hand, when the same phase property is provided for the rear wheel as a steering property, the running stability can be improved.

The above and other features of the present invention will become apparent from the following description of the preferred embodiment while making reference to the accompanying drawings.

BRIEF DESCRIPTION OF THE DRAWINGS

FIG. 7 is a flow chart of a control of a vehicle suspension system and four wheel steering system according to a preferred embodiment of the present invention.

FIG. 9 is a flow chart of a control in accordance with the present invention but showing another embodiment.

DESCRIPTION OF THE PREFERRED EMBODIMENTS

Figure 1:
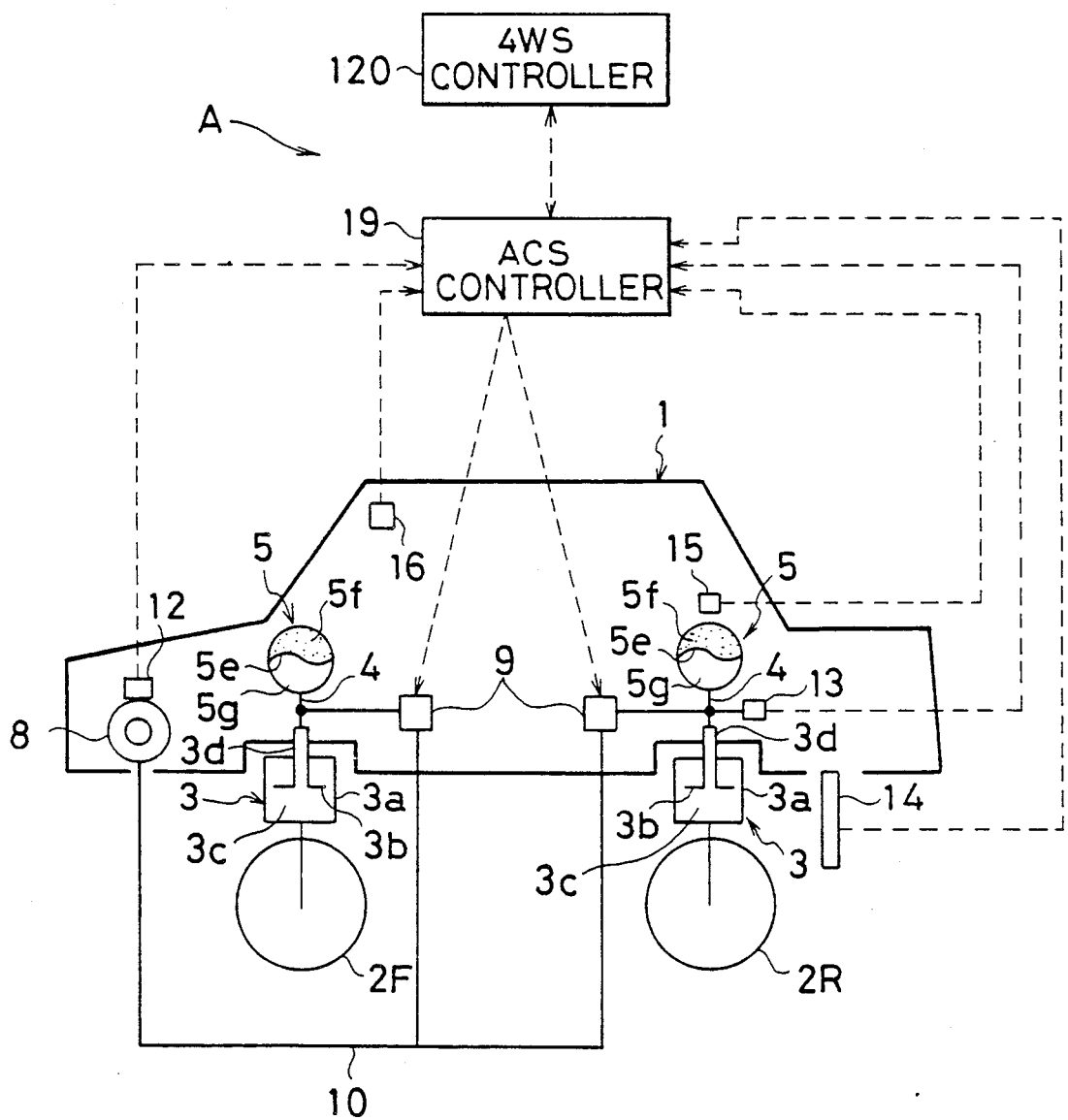
FIG. 1 is an overall schematic view of an active suspension system of a vehicle in accordance with a preferred embodiment of the present invention.

FIG. 1 is an overall schematic view of an active suspension system A of a vehicle according to the present invention. In FIG. 1, numeral 1 designates a vehicle body, and 2F and 2R respectively designate front and rear vehicle wheel members. Between vehicle body 1 and front wheels 2F, and between vehicle body 1 and rear wheels 2R are provided hydraulic cylinders 3, 3. A piston 3b inserted into each cylinder body 3a defines a fluid pressure chamber 3c inside each hydraulic cylinder 3. The upper end portion of a rod 3d connected to the piston 3b is connected to the vehicle body 1. and cylinder bodies 3a, 3a are connected to vehicle wheels 2F, 2R respectively.

A gas spring 5 is connected to the fluid pressure chamber 3c of each hydraulic cylinder 3 through a communicating path 4. Each gas spring 5 is divided into a gas chamber 5f and a fluid pressure chamber 5g by a diaphragm 5e, and the fluid pressure room 5g is connected to the fluid pressure chamber 3c of the hydraulic cylinder 3 through the communicating path 4 and the piston 3b of the hydraulic cylinder 3.

Numeral 8 designates a hydraulic pump, and numerals 9, 9 designate proportional flow control valves connected to the hydraulic pump 8 through a fluid pressure path 10. These valves function to control fluid supply for the hydraulic cylinders 3, 3.

Numeral 12 designates a discharge pressure gauge which senses the discharge pressure of the hydraulic pump 8, and numerals 13, 13 designate fluid pressure sensors which sense the fluid pressure of the fluid pressure chamber 3c in the hydraulic cylinders 3, 3. Numerals 14, 14 designate vehicle height sensors which sense the vehicle height displacement (cylinder stroke length), and numerals 15, 15, 15 designate vertical acceleration sensors which sense the vertical acceleration of the vehicle (spring acceleration of the wheels 2F, 2R). These vertical acceleration sensors 15, 15, 15 are provided one above each of the right and left front wheels 2F within an approximately horizontal plane, and one at the center of the vehicle in the widthwise direction between the rear wheels 2R. Namely, a total of three vertical acceleration sensors are provided.

Numeral 16 designates a vehicle speed sensor.

The signals from the above mentioned sensors are input to a controller 19 including a CPU (central processing unit) and the like, which controls the proportional flow control valves 9, 9 so as to change the suspension characteristics.

Figure 2:
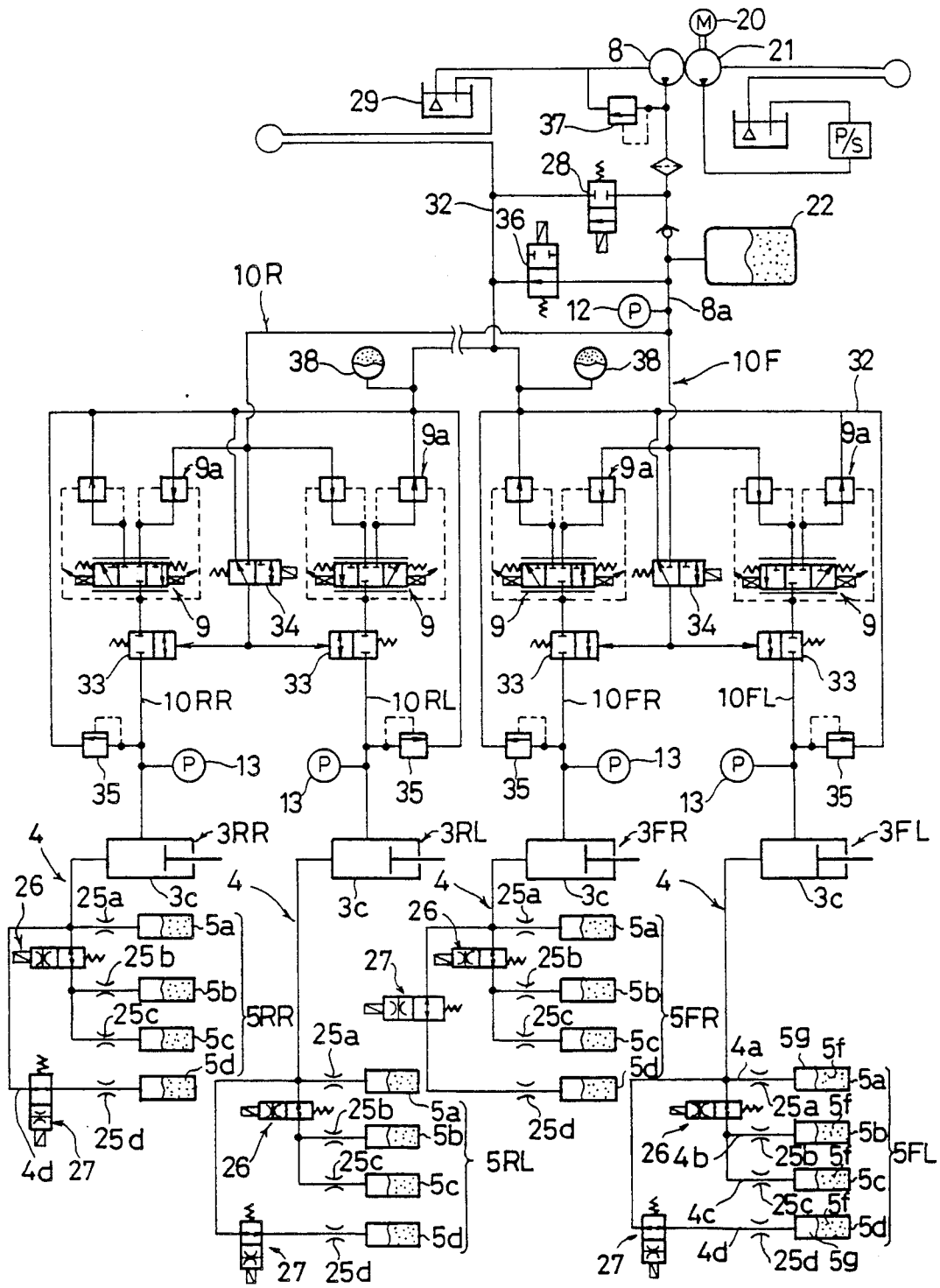
FIG. 2 is a circuit diagram of a hydraulic system for controlling fluid supply for hydraulic cylinder devices.

FIG. 2 shows a hydraulic circuit for supplying and discharging hydraulic fluid for the hydraulic cylinders 3.

As seen in FIG. 2, the hydraulic pump 8 is connected in tandem with a hydraulic pump 21 driven by a driving motor 20 for a power steering device. A discharge tube 8a has an accumulator 22 connected with an intermediate portion thereof and a downstream portion of the 1 discharge tube 8a branches off into a front wheel tube 10F and a rear wheel tube 10R. The front wheel tube 10F branches off into a left front wheel tube 10FL and a right front wheel tube 10FR, the downstream ends of which are connected with the fluid pressure chambers 3c, 3c of the hydraulic cylinders 3FL, 3FR.

Likewise, the rear wheel tube 10R branches off into a left wheel tube 23RL and a right wheel tube 10RR, the downstream ends of which are connected with the fluid pressure chambers 3c, 3c of the hydraulic cylinders 3RL, 3RR.

The gas spring devices 5FL through 5RR connected with the hydraulic cylinders 3FL through 3RR each has a plurality (four) of gas springs 5a, 5b, 5c, 5d which are connected through branch communicating paths 4a through 4d to a common communicating path 4 connected with the fluid pressure chamber 3c of the corresponding hydraulic cylinder 3. The branch communicating paths 4a through 4d of the plurality (first through fourth) gas springs 5a through 5d of each wheel have orifices 25a through 25d. The damping action by the orifices 25a through 25d and the buffer action of gas charged in the gas chambers 5f are combined to provide the basic function as a suspension system.

In the gas springs 5FL through 5RR of each vehicle wheel, a damping force switching valve 26 which switches the damping force by adjusting the path area of the communicating path 4 is provided on the common communicating path 4 between the first gas spring 5a and the second gas spring 5b. The switching valve 26 takes two positions: an expanded position increasing the common communicating path 4 and a reduced position reducing the area of the common communicating path 4. When the vehicle is running on a curved path, the switching valve 26 is positioned at the reduced position so that the hydraulic flow restricted to and from the chamber 5g of the springs 5b and 5c. Thus, the hydraulic flow is restricted for the chamber 3c of the cylinder 3 to improve the responsiveness. Similarly, one of the branch communicating paths 4d is provided with the switching valve 27 which takes an expanded position providing an increased area of the path 4d and a reduced position providing a reduced area of the path 4d. When the switching valve 27 takes the expanded position, the hydraulic flow is increased for the pressure chamber 5g so that the suspension property is made soft. By contrast, when the switching valve 27 takes the reduced position, the hydraulic flow is reduced for the pressure chamber 5g so that the suspension property is made hard.

On the discharge tube 8a of the hydraulic pump 8 is provided an unloader relief valve 28 with an open position and a closed position connected near the accumulator 22. When the discharged fluid pressure measured by the discharge pressure gauge 12 is not less than a preset upper limit value, the relief valve 28 is switched from the closed position shown in FIG. 2 to the open position so that the fluid in the hydraulic pump 8 is returned directly to a reserve tank 29, whereby the fluid accumulation pressure in the accumulator 22 is controlled to be maintained at a preset value. In the above mentioned manner, the accumulated fluid of preset pressure from the accumulator 22 is supplied to the hydraulic cylinders 3.

As the left front wheel, the right front wheel, the left rear wheel and the right rear wheel are identical in configurations, only the left front wheel will be described in the following.

As explained above, the left front wheel tube 10FL is provided with the proportional flow control valve 9 which has three positions: a stopping position closing all ports, a supplying position where the left front wheel tube 10FL is opened to the supplying side, and a discharge portion where the hydraulic cylinder 3 of the left front wheel tube 10FL is connected through a return tube 32. The proportional flow control valve 9 is further provided with pressure-compensated valves 9a, 9a. The pressure-compensated valves 9a, 9a maintain the fluid pressure in the fluid pressure chamber 3c at a preset valve when the proportional flow control valve 9 is positioned at either the supplying position or the discharge position.

Between the hydraulic cylinder 3 and the proportional flow control valve 9 is provided a switching valve 33 responsive to a pilot pressure, which opens and closes the left front tube 10FL. When a solenoid valve 34 introducing the pressurized fluid in the left front wheel tube 10F is at the open position, the fluid pressure of the solenoid valve 34 is introduced as the pilot pressure to the switching valve 33. When the pilot pressure is not less than a predetermined value, the switching valve 33 operates to open the left front wheel tube 10FL, so that the proportional flow control valve 9 allows the hydraulic fluid flow into the hydraulic cylinder 3. When the solenoid valve 34 is closed, the left front wheel tube 10FL is closed liquid-tightly to insure the hydraulic fluid flow to and from the chamber 3c of the cylinder 3.

The numeral 35 designates a relief valve which opens to return the hydraulic fluid in the fluid pressure chamber 3c of the hydraulic cylinder 3 to the return tube 32 when the fluid pressure of the fluid pressure chamber 3c rises abnormally. The numeral 36 designates an ignition switch interlock valve provided on a hydraulic path connecting the paths 32 and 8a in the vicinity of the accumulator 22 on the discharge tube 8a of the hydraulic pump 8. When the ignition switch is at the off position, the interlock valve 36 is controlled to open (shown in FIG. 2) so as to return the fluid in the accumulator 22 to the tank 29 and relieve the high pressure condition of the fluid. The numeral 37 designates a relief valve which returns fluid to the tank 29 and lowers the fluid pressure when the discharge pressure of the hydraulic pump 8 rises abnormally. The numerals 38, 38 designate return accumulators connected to the return tube 32 for accumulating the fluid discharged from the hydraulic cylinder 3.

FIG. 3A, 3B, 3C and 3D are block diagrams illustrating a control of suspension characteristics by the controller 19.

As shown in FIG. 3A, 3B, 3C and 3D, there are provided a control system C1 for controlling the vehicle height to a desired value based on vehicle height displacement signals $X_{FR}$, $X_{FL}$, $X_{RR}$, $X_{RL}$ from the vehicle height sensors 14, 14, 14, 14 of the vehicle wheels, a control system C2 for suppressing the vertical vibration of the vehicle based on vertical acceleration signals $G_{FR}$, $G_{FL}$, $G_R$ of the three vertical acceleration sensors 15, 15, 15 and a control system C3 for suppressing vehicle body warping computed from pressure signals of the fluid pressure C4 sensors 13, 13, 13, 13 of the vehicle wheels, and a control system for improving the responsiveness in the cornering operation of the vehicle.

First, in the control system C1, numeral 40 designates a bounce component arithmetic unit which computes the vehicle bounce components by summing not only the outputs $X_{FR}$, $X_{FL}$ of the right and left front wheels 2F but also the outputs $X_{RR}X_{RL}$ of the right and left rear wheels 2R from the vehicle height sensors 14, 14, 14, 14. Numeral 41 designates a pitch component arithmetic unit which computes the vehicle pitch components by subtracting the summed outputs $X_{RR}$, $X_{RL}$ of the right and left rear wheels 2R from summed outputs $X_{FR}$, $X_{FL}$ of the right and left front wheels 2F. Numeral 42 designates a roll component arithmetic unit which computes vehicle roll components by summing the difference $X_{FR} - X_{FL}$ of the outputs of the right and left front wheels 2F and the difference $X_{RR} - X_{RL}$ of the outputs of the right and left rear wheels 2R. Numeral 43 designates a bounce control unit to which is input the vehicle bounce component computed in the bounce component arithmetic unit 40 and a desired average vehicle height $T_H$, and which computes control variables including proportional and differential gains for the proportional flow control valves 9, 9, 9, 9 based on the following formula:

$$K_{B1} + [T_{B2} \cdot S / (1 T_{B2} \cdot S)] \cdot K_{B2}$$

wherein $K_{B1}$, $K_{B2}$ are constants,

S is Laplacean which is increased as oscillation frequency is increased $T_{B2}$ is time constant.

Numeral 44 designates a pitch component unit to which vehicle pitch components computed in the pitch component arithmetic unit 41 are introduced, and which computes control variables for the proportional flow control valves 9, 9, 9, 9 based on the same formula under pitch control. Numeral 45 designates a roll control unit to which is input vehicle roll components computed in the roll component arithmetic unit 42 and a desired roll displacement $T_R$, and which computes control variables of the proportional flow control valves 9, 9, 9, 9 based on the same formula under roll control so as to get an inclined vehicle attitude providing the desired roll displacement $T_R$.

For the purpose of controlling vehicle height to the desired value, the control variables computed in the above mentioned control units 43, 44, 45 are inverted with respect to the signs of the vehicle height displacement signals of vehicle height sensors 14, 14, 14, 14. After that, each control bounce, pitch and roll variable for the vehicle wheels are added and flow signals $Q_{FR1}$, $Q_{FL1}$, $Q_{RR1}$, $Q_{RL1}$ of corresponding proportional flow control valves 9, 9, 9, 9 are obtained in the control system C1.

Next in the control system C2, numeral 50 designates a bounce component arithmetic unit which computes the vehicle bounce components by summing the outputs $G_{FR}$, $G_{FL}$, $G_R$ of the three vertical acceleration sensors 15, 15, 15. Numeral 51 designates a pitch component arithmetic unit which computes vehicle pitch components by subtracting the output $G_R$ of the rear wheel 2R from the summation of each half-value of outputs $G_{FR}$, $G_{FL}$ of the right and left front wheels 2F in the three vertical acceleration sensors 15, 15, 15. Numeral 52 designates a roll component arithmetic unit which computes vehicle roll components by subtracting the output $G_{FL}$ of the left front wheel from output $G_{FR}$ of the right front wheel.

Further, numeral 53 designates a bounce control unit to which is input vehicle bounce components computed in the bounce component arithmetic unit 50, and which computes control variables of the bounce component including proportional, differential and integral gains for the proportional flow control valves 9, 9, 9, 9 of the wheels based on the following formula;

$$[T_{B3} \cdot S/(1+T_{B3} \cdot S)] \cdot K_{B3} + K_{B4} + [T_{B5} \cdot S/(1+T_{B5} \cdot S)] \cdot K_{B5}$$

wherein $K_{B3}$, $K_{B4}$ are

S is Laplacean which is increased as oscillation frequency is increased, $T_{B3}$, $B_{B5}$ are time constants.

Numeral 54 designates a pitch control unit to which is input vehicle pitch components computed in the pitch component arithmetic unit 51, and which computes control variables for the proportional flow control valves 9, 9, 9, 9 based on the same formula as the bounce component the unit 51. Number 55 designates a roll control unit to which is input vehicle roll components computed in the roll component arithmetic unit 52, and which computes controlled variables for the proportional flow control valves 9, 9, 9, 9 based on the same formula as the bounce component of 51.

For the purpose of suppressing vehicle vertical vibration by the bounce components, pitch components and roll components controlled variables in above mentioned control units 53, 54, 55 are inverted in sign in all the wheels, thereafter, each of control bounce, pitch and roll variable in each vehicle wheel is added and flow signals $Q_{FR}$, $Q_{FL}$, $Q_{RR}$, $Q_{RL}$ for corresponding proportional flow control valves 9, 9, 9, 9 are obtained in the control system C2. The variables are weighted by a coefficient $k = 1.08$ of the front wheels.

Next in the control system C3, a warp control unit 60 includes a fluid pressure ratio arithmetic unit 60a of the front wheel to which fluid pressure signals $P_{FR}$, $P_{PL}$ of the fluid pressure sensors 13, 13 of the two front wheels are introduced. The unit 60a computes the ratio $(P_{FR} - P_{FL})/(P_{FR} + P_{FL})$ of the right and left front wheel pressure difference $(P_{FR} - P_{FL})$ to the front wheel total fluid pressure $(P_{FR} + P_{FL})$. The warp control unit 60 also includes a fluid pressure ratio arithmetic unit 60b of the rear wheel which similarly computes the fluid pressure ratio $(P_{RR} - P_{RL})/(P_{RR} + P_{RL})$ of the rear wheel. After the fluid pressure ratio of the rear wheel is multiplied by a coefficient $W_r$, the multiplied value is subtracted from the fluid pressure ratio of the front wheel, thus the subtracted value is multiplied by a gain coefficient $W_A$ and moreover is weighted by the coefficient $k = 1.08$ of the front wheel. The control variables for the wheels are inverted in sign for the purpose of being equalized between right and left wheels, so that flow signals $Q_{FR}$, $Q_{RL}$, $Q_{RR}$, $Q_{RL}$ of corresponding proportional flow control valves 9, 9, 9, 9 are obtained.

Figure 3A:
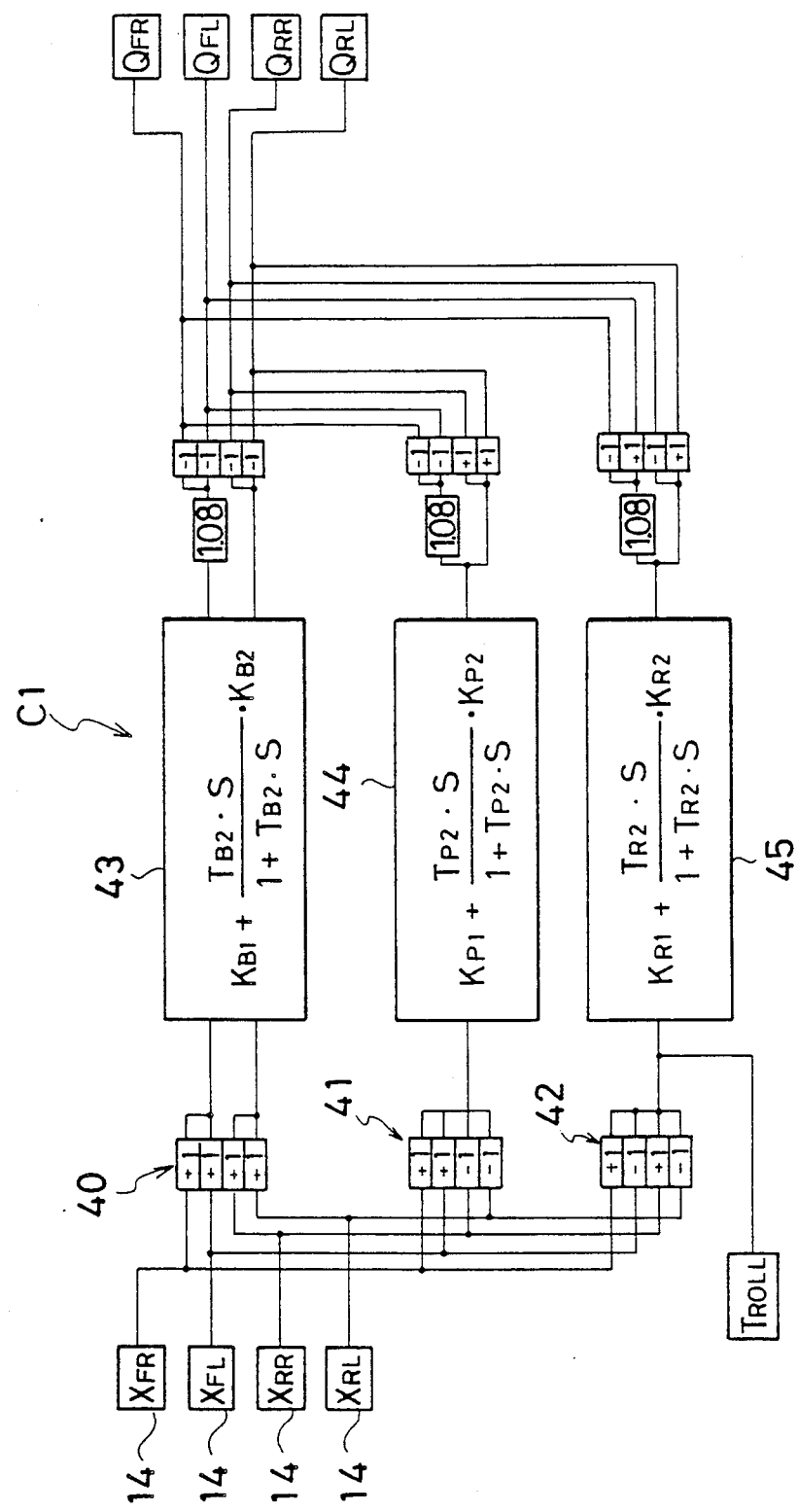
FIG. 3A through 3D are block diagrams illustrating control of suspension characteristics by a controller.
Figure 3B:
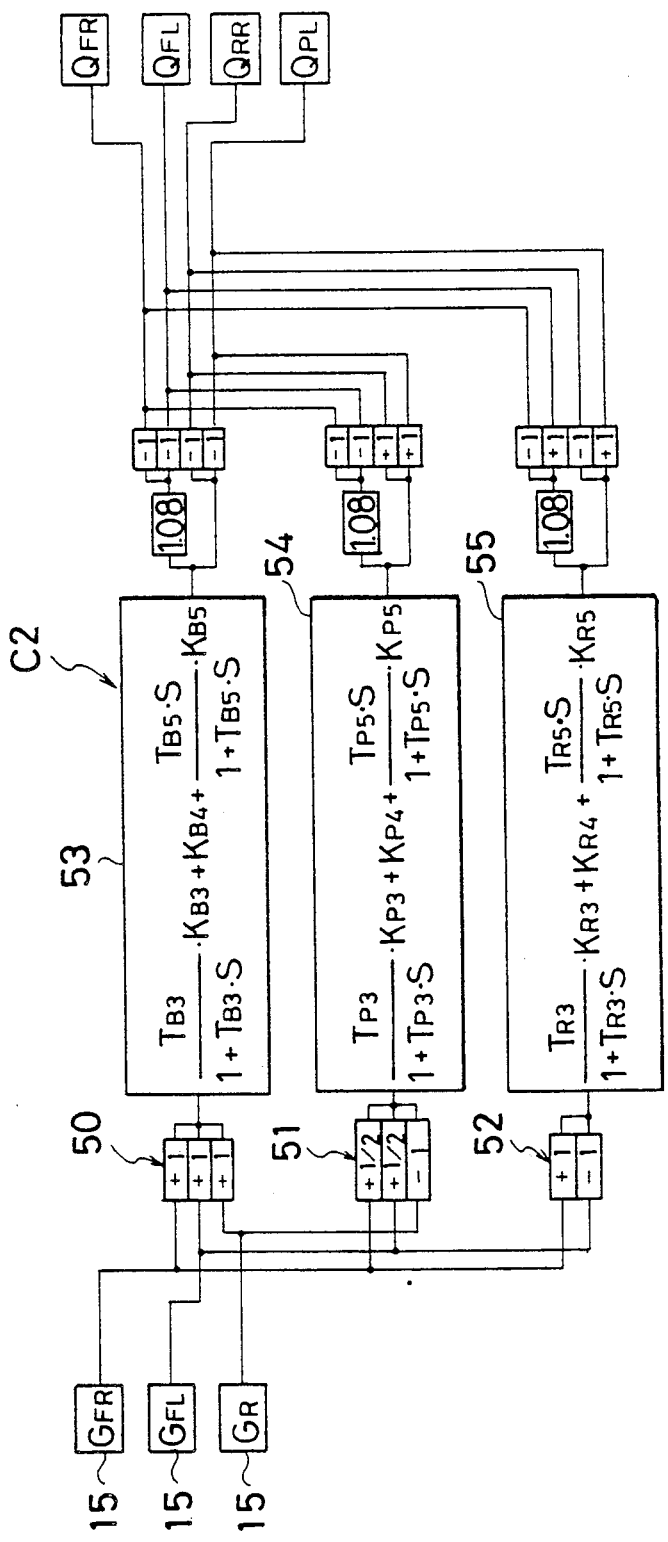
Figure 3C:
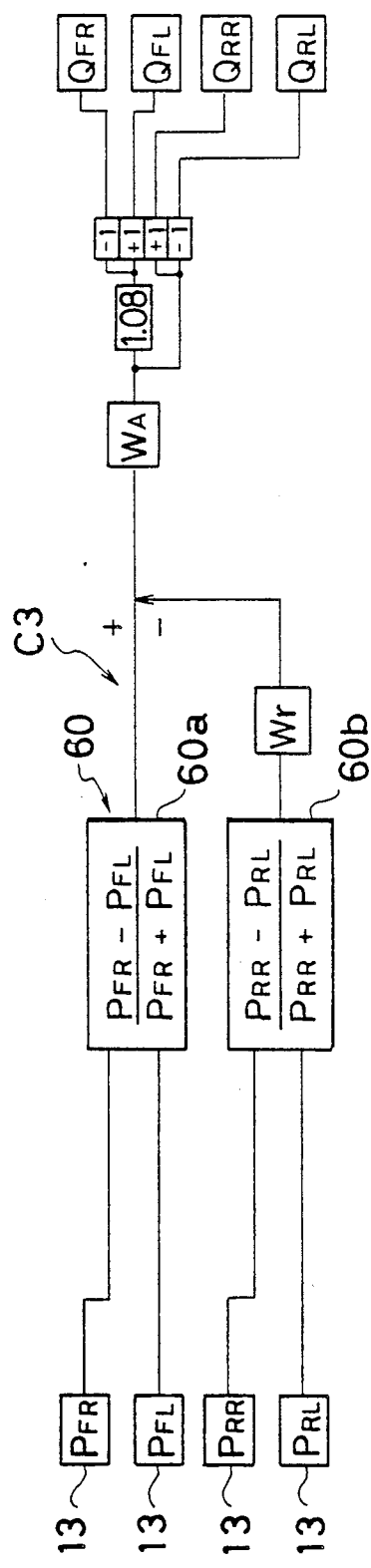
Figure 3D:
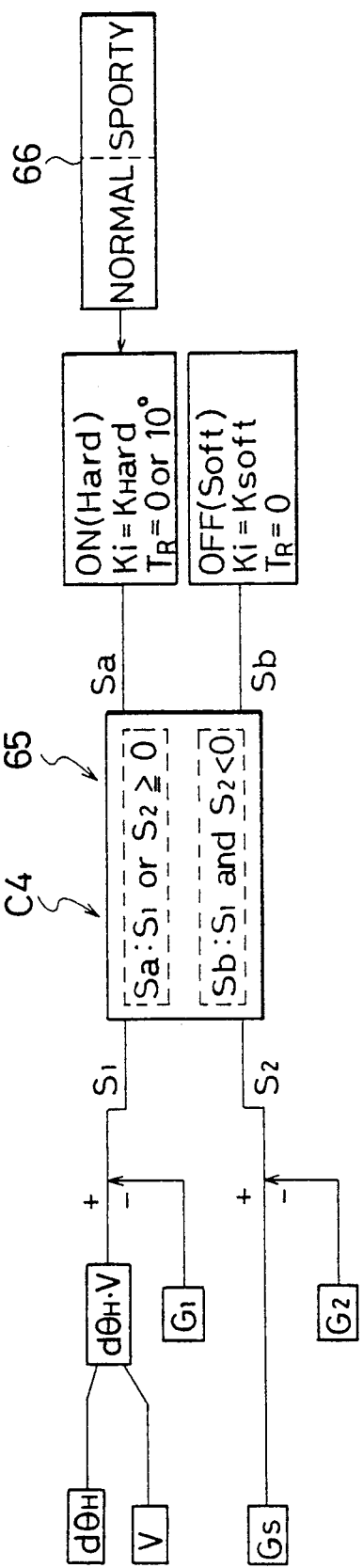

As shown in FIG. 3D, the control system C4 controls the flow of the hydraulic fluid for the cylinder 3 for improving the responsiveness thereof.

In the control system C4, the steering speed or the change rate $d\theta_H$ of the steering angle $\theta$ is multiplied by the vehicle speed V. A reference value $G_1$ is subtracted from the value $d\theta_H \cdot V$ to obtain a value $S_1$ which is introduced into the cornering judgment section 65. A value $S_2$, which is obtained by subtracting a reference value $G_2$, from a lateral acceleration G, acting on the vehicle. The control system C4 finds that the vehicle is in a cornering condition when the value $S_1$ or $S_2$ is not less than zero and produces signals Sa for making the suspension property hard to provide the switching valve 26 with the reduced position thereof and to provide the constants $K_i$ (i=B1~B5, P1~P5, and R1~R5) with large values $K_H$ to thereby improve the responsiveness of the cylinder 3.

The desired roll displacement $T_R$ is changed between a normal mode and a sporty mode by means of a manual switch 66. When the normal mode is selected, the value $T_R$ is set at zero. When the lateral acceleration Gs is 0.1~0.3 g in the sporty mode, the value $T_R$ takes an angle of $-10$ degrees, when the value $T_R$ takes a negative value, the vehicle is rolled inwardly of the cornering circle or is rolled in a direction opposite to a natural rolling direction.) When the value $T_R$ takes a value other than the value of 0.1~0.3 g, the desirable value $T_R$ is set at zero.

On the other hand, when the value $S_1$ and $S_2$, are less than 0, the control system C4 finds that the vehicle is in a straight path and produces signals Sb for making the suspension property soft to provide the switching valve 26 with the expanded position, to provide the constants Ki with normal value Ks and to provide the desired value $T_R$ with zero.

Figure 4:
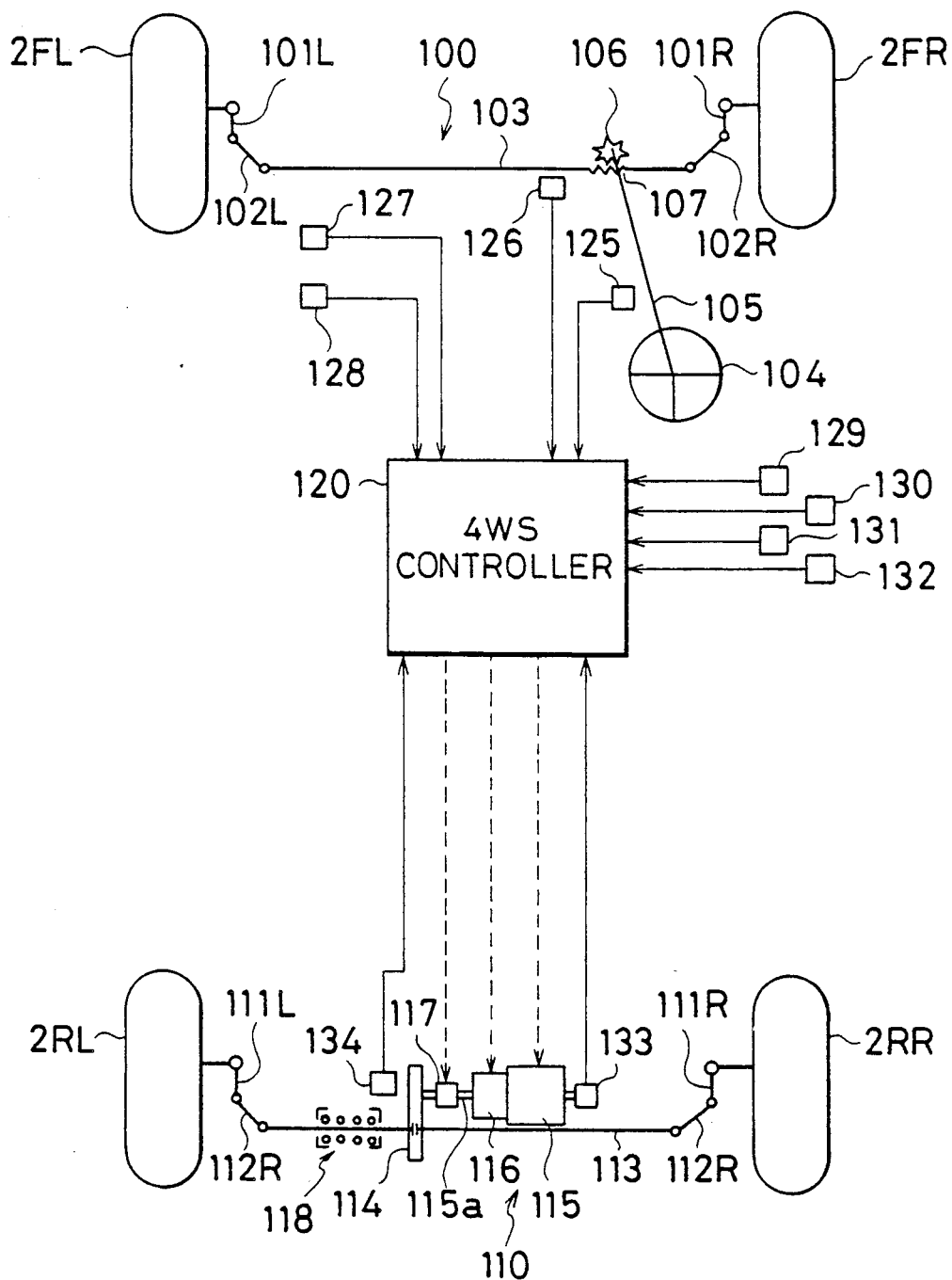
FIG. 4 is a schematic view of a steering system to which the present invention can be applied.

Referring to FIG. 4, there is shown a schematic view of a four wheel steering system according to the preferred embodiment of the present invention.

Numeral 100 designates a front steering mechanism for steering the right and left front wheels 2FR, 2FL and numeral 110 designates a rear steering mechanism for steering the right and left rear wheels 2RR, 2RL.

The front steering mechanism 100 is provided with a right and left knuckle arms 101R, 101L, tie rods 102R, 102L, and a steering rod 103 for connecting the tie rods 102R, 102L. Numeral 104 is a steering wheel of which shaft 105 is provided with a pinion 106 at a lower end. The pinion 106 is meshed with a rack 107 so that the steering wheel 104 is operated to move the steering rod 103 to thereby steer the right and left front wheels 2FR, 2FL.

Likewise, the rear steering mechanism 110 is provided with a pair of right and left knuckle arms 111R, 111L, tie rod 112R, 112L and rear wheel steering rod 113. With the steering rod 113 is connected a speed reduction mechanism 114 which is connected with an output shaft 115a of a servo motor 115 so that the reduction mechanism 114 moves the steering rod laterally to thereby steer the right and left rear wheels 2RR, 2RL.

There is provided a magnetic brake 116 on the output shaft 115a of the servo motor 115. When the magnetic brake 116 is actuated, the rear wheel steering rod is locked to hold the steering angle of the rear wheels 2R.

There is provided a magnetic clutch 117 between the output 115a of the servo motor 115 and the reduction mechanism 114. The steering rod 113 is provided with a restoring mechanism 118 for restoring the steering rod 113 to a neutral position when an abnormality occurs in steering the rear wheels 2R, the magnetic clutch 117 is released to disengage the servo motor 115 from the steering rod 113 so that the steering rod is restored to the neutral position by means of the restoring mechanism 118. Thus, the rear wheels 2R can be positioned at the neutral position in the abnormal condition.

Numeral 120 designates 4WS controller as a control means for controlling the servo motor 115 and the magnetic brake 116. The controller 120 receives various signals from sensors 125~134. The sensor 125 is a steering angle sensor for detecting a steering angle of the steering wheel 104. The sensor 126 is a front wheel steering angle sensor for detecting steering angle of the front wheels 2F from the lateral displacement of the front steering rod 130. The sensors 127 and 128 are vehicle speed sensors. The sensor 129 is a neutral switch for detecting that a shift range is in a neutral position and a clutch pedal is operated in a manual transmission. The sensor 130 is an inhibiter switch for detecting neutral position N and parking position P of an automatic transmission, the sensor 131 is a brake switch for detecting operation of the brake pedal, the sensor 132 is an engine switch for detecting operation of the engine, the sensor 133 is a rotation sensor for detecting a rotation angle of the servo motor 115, and the sensor 134 is a rear wheel steering angle sensor for detecting a steering angle of the rear wheels 2R.

Figure 5:
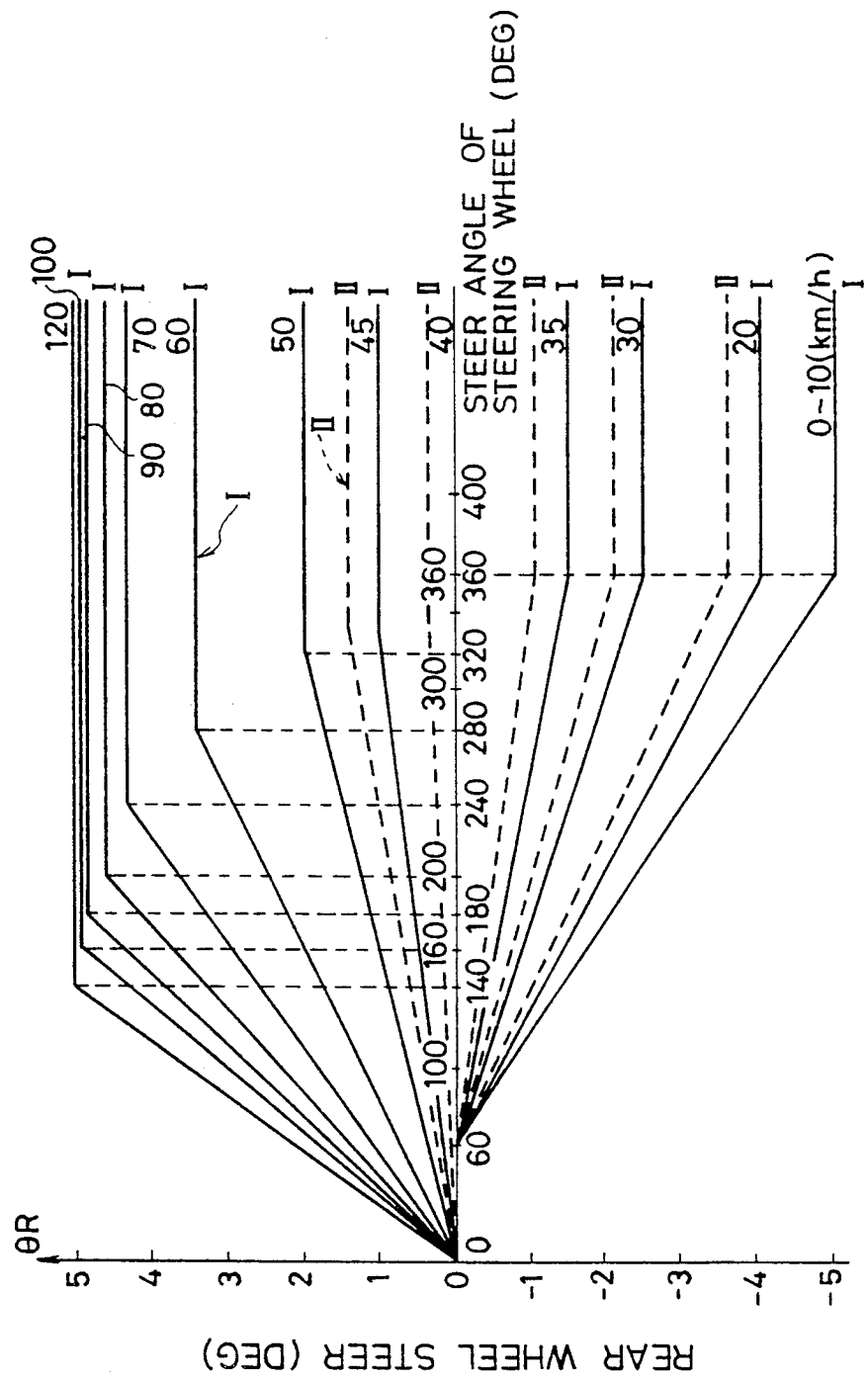
FIG. 5 is a graphical representation showing a relationship between rear wheel steering angle and steering wheel steering angle.
Figure 6:
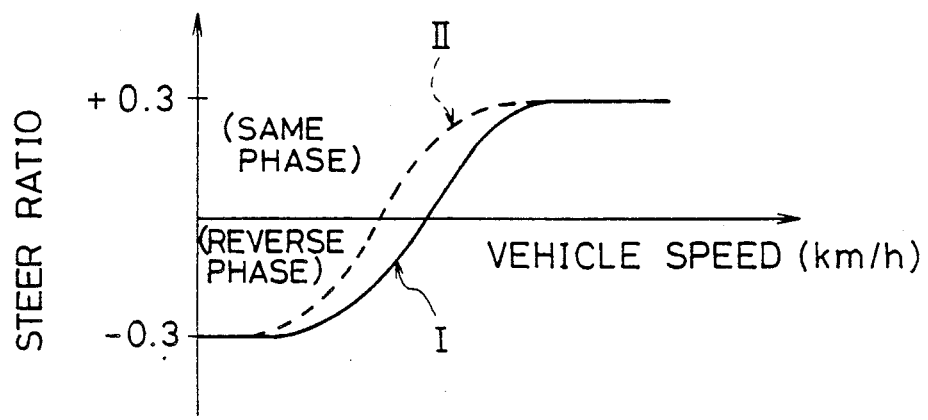
FIG. 6 is a graphical representation showing a relationship between steering property and steering ratio.

The controller 120 for the four wheel steering system is provided with a memory in which rear wheel steering properties are stored as shown in FIGS. 5 and 6. The rear wheel steering properties are shown in the form of steering ratios $\theta_H$ of the rear wheel steering angle $\theta_R$ to the front wheel steering angle $\theta_F$. The steering ratios $\theta_H$ changes from a reverse phase in which the rear wheels 2R are steered in the opposite direction to the front wheels 2F to a same phase in which the rear wheels 2R are steered in the same direction as the front wheels 2F as the vehicle speed V is increased as seen from the drawings.

A steering property II shown by a broken line is changed toward the same phase in a lower vehicle speed than a steering property I shown by a real line.

According to the present invention, the ACS controller 19 for the active suspension system A is cooperated with the 4WS controller 120. The 4WS controller 120 changes the steering property after it receives the mode signal selected by the manual switch 66. The ACS controller 19 changes the roll property of the vehicle. According to the present invention, the change of the steering property by the 4WS controller 120 is timed with the change of the roll property of the vehicle by the ACS controller 19.

The control is carried out in accordance with a procedure shown in FIG. 7 in the form of flow chart.

Referring to FIG. 7, it is judged whether or not the sporty mode is selected (step S1). If the judgment is Yes, or if the sporty mode is selected, the 4WS controller 120 selects the steering property I to control the rear wheel steering mechanism 110 based on the steering property I (step S2).

The 4WS controller 120 computes the lateral acceleration Gs of the vehicle based on the vehicle speed v and the steering speed $d\theta_H$ (step S3). It is judged whether or not the lateral acceleration Gs is in a range of 0.1~0.3 g (step S4). If the judgment is Yes, in step S5, the desired roll displacement $T_R$ is set at an angular value $-10$ degrees. The roll control is made so as to get an attitude of the vehicle having a roll angle $-10$ degrees in the cornering operation.

In the step S4, if the judgment is No, or if the lateral acceleration Gs is not in the range of 0.1~0.3 g, the desired roll displacement $T_R$ is set at zero (step S6). Then, the roll control is executed to accomplish the roll angle of zero so that the vehicle takes horizontal attitude even in a cornering operation.

Figure 8:
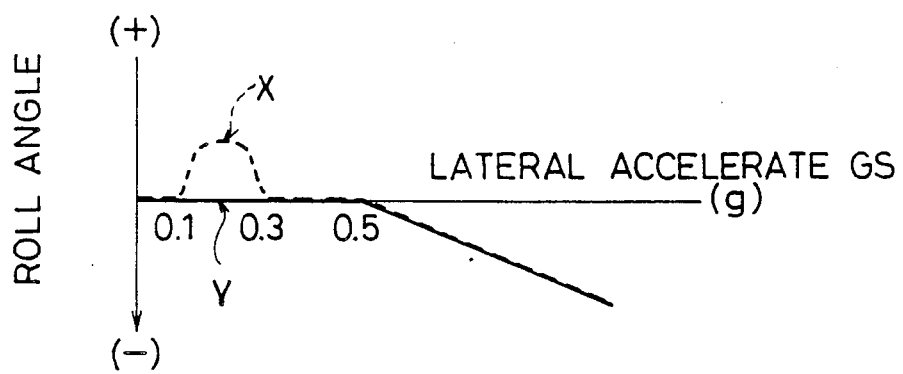
FIG. 8 is a graphical representation between a roll angle and a lateral acceleration.

Through the procedures of steps S3 to S6, the sporty roll property of the vehicle is shown as a broken line X in FIG. 8, when the sporty mode is selected. In FIG. 8, the roll angle is increased when the lateral acceleration is increased more than a value of about 0.5 g. This is because the load caused by the rolling action and acting on the vehicle is increased beyond a control limit by the active suspension system A.

In step S1, if the judgment is No, or if the normal mode is selected by the manual switch 66, the desired roll displacement $T_R$ is set at zero (step S7). The roll control is made to accomplish the roll angle of zero to provide the vehicle with the horizontal attitude. The roll property under the normal mode is shown by a real line Y in FIG. 8. The property II of FIG. 6 is selected as the steering property under the normal mode. Thus, the rear wheel steering mechanism is controlled based on the steering property II. The above procedure constitutes a property changing mechanism for changing the steering property for the rear wheels 2R between the properties I and II in synchronism with the change of the roll properties between X and Y.

In the illustrated embodiment, when the sporty roll property X is selected to provide a strong reverse roll property, the steering property I is selected to provide a strong reverse phase property so as to improve the visibility of the cornering direction and operability during the cornering operation. Thus, the driver can get a satisfactory sporty feeling in driving the vehicle.

Referring to FIG. 9, there is shown a modified control of the steering control cooperated with the roll control.

It is judged whether or not the sporty mode X is selected (step S1). If the sporty mode X is selected, the 4WS controller 120 selects the steering property II to control the rear wheel steering mechanism 110 based on the steering property II (step S2).

The 4WS controller 120 computes the lateral acceleration Gs of the vehicle based on the vehicle speed V and the steering speed d $\theta_H$ (step S3). It is judged whether or not the lateral acceleration Gs is in a range of 0.1~0.3 g (step S4). If the judgment is Yes, in step S5 the desired roll displacement $T_R$ is set at an angular value $-10$ degrees. The roll control is made so as to get an attitude of the vehicle having the roll angle $-10$ degree in the cornering operation.

In the step S4, if the judgment is No, or if the lateral acceleration Gs is not in the range of 0.1~0.3 g, the desired roll displacement $T_R$ is set at zero (step S6). Then, the roll control is executed to accomplish the roll angle of zero so that the vehicle takes horizontal attitude even in a cornering operation.

Through the procedures of steps S3 to S6, the sporty roll property of the vehicle is shown as a broken line X in FIG. 8, when the sporty mode is selected.

In step S1, if the judgment is No, or if the normal mode is selected by the manual switch 66, the desired roll displacement T is set at zero (step S7). The roll control is made to accomplish the roll angle of zero to provide the vehicle with the horizontal attitude. The roll property under the normal mode is shown by a real line Y in FIG. 8. The property I of FIG. 6 is selected as the steering property under the normal mode. Thus, the rear wheel steering mechanism is controlled based on the steering property I (step 8). The above procedure constitutes a property changing mechanism for changing the steering property for the rear wheels 2R between the properties I and II in synchronism with the change of the roll properties between X and Y.

In the illustrated embodiment, when the sporty roll property X is selected to provide a strong reverse roll property, the steering property II is selected to provide a weak reverse phase property so as to suppress the rolling action of the vehicle as low as possible and to thereby improve the running stability during the cornering operation. Thus, the driver can get a stable running property.

Figure 10:
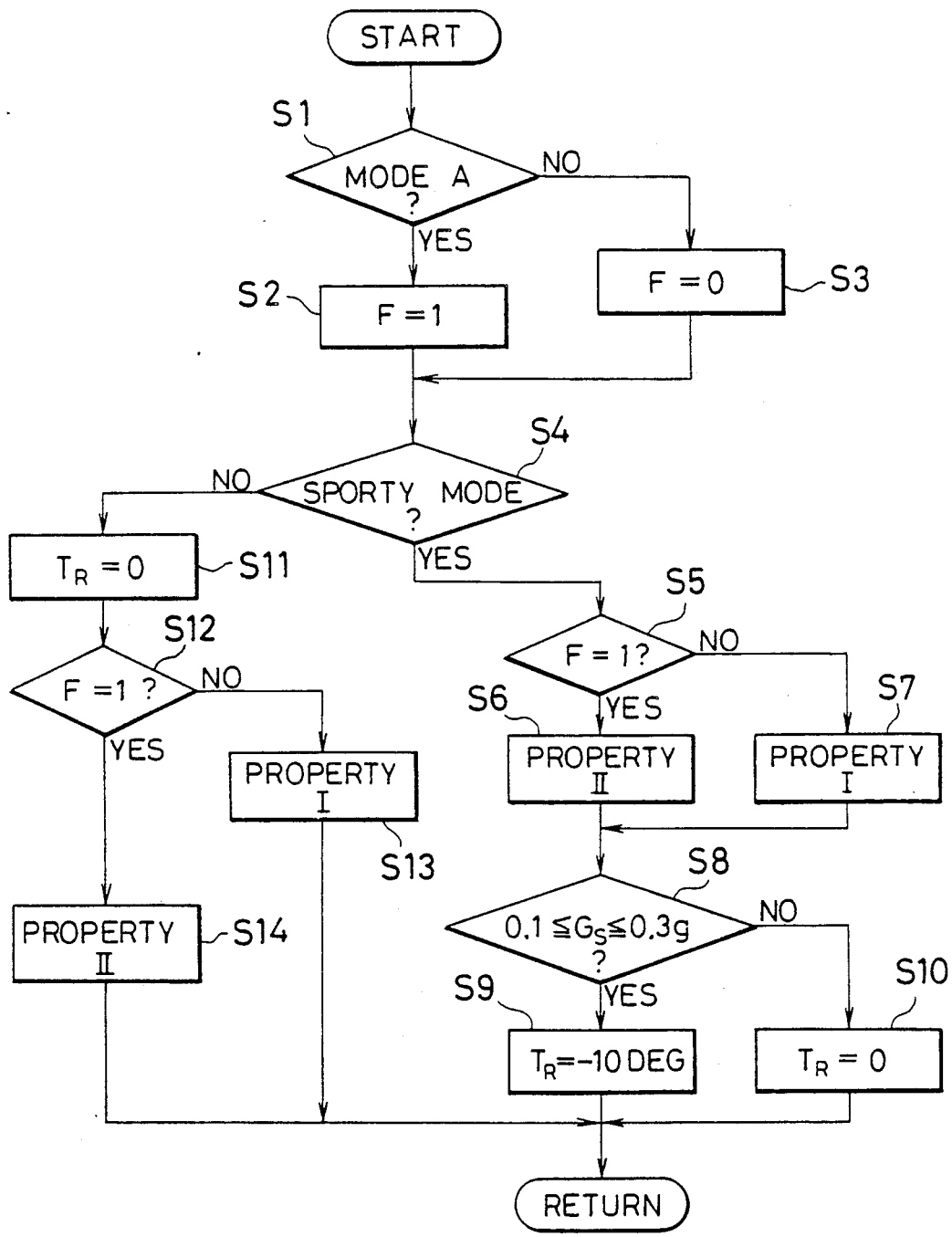
FIG. 10 is a flow chart of a control in accordance with the present invention but showing a still another embodiment.

Referring to FIG. 10, there is shown a steering and roll control in accordance with still another embodiment of the present invention.

In this embodiment, there is provided a manual switch for switching between a mode A in which the steering property I is selected in the case where the sporty mode is selected in the roll control and a mode B in which the steering property II is selected in the case where the sporty mode is selected in the roll control.

In step S1, it is judged whether or not the mode A is selected by the manual switch. If the judgment is Yes, a flag F is set at 1 (step S2), otherwise, the flag is set at 0 (step S3). In step S4, the judgment is made as to whether or not the sporty mode is selected in the roll control In the case where the sporty mode is selected, the value of the flag F is judged in step S5. If the flag F has the value 1, the property II is selected in step S6. If the flag F is the value 0, the property I is selected in step S7. Next is Step S8, it is judged whether or not the lateral acceleration Gs is in a range of 0.1~0.3 g (step S8). If the judgment is Yes, in step S9, the desired roll displacement $T_R$ is set at an angular value $-10$ degree. The roll control is made so as to get an attitude of the vehicle having the roll angle $-10$ degrees or the reverse roll angle 10 in the cornering operation.

In the step S8, if the judgment is No, or if the lateral acceleration Gs is not in the range of 0.1~0.3 g, the desired roll displacement $T_R$ is set at zero (step S10). Then, the roll control is executed to accomplish the roll angle of zero so that the vehicle takes horizontal attitude even in a cornering operation.

In this case, the steering property selected depends on the value of the flag F. In step S4, when the normal mode is selected, the desired roll displacement $T_R$ set at zero in step 11. Then, the value of the flag F is judged in step S12. If the flag F has the value 0, the property I is selected in step S13. If the flag F is the value 1, the property II is selected in step S14.

According to the illustrated embodiment, the steering property selected in synchronism with the roll property between the sporty property X and normal property Y can be selected between the strong reverse phase property I and the weak reverse phase property II through the manual switch.

In another embodiment, the gas springs 5 are omitted.

What is claimed is:

1. A control system for a vehicle comprising:
means for providing a supply of hydraulic fluid;
a plurality of hydraulic cylinders, each of said hydraulic cylinders provided between a vehicle body and one of a plurality of vehicle wheels;

proportional flow control valves for controlling the supply of hydraulic fluid to each of the hydraulic cylinders;

a vehicle suspension system controller for controlling said proportional flow control valves in accordance with a desired roll displacement;

a manual switch for selecting one of a normal roll control mode, in which said desired roll displacement value is zero, and a sporty roll control mode, in which said desired roll displacement value is not necessarily zero;

a rear wheel steering mechanism for steering right and left rear vehicle wheels; and a four wheel system controller for selecting one of a stronger phase steering property and a weaker phase steering property;

said vehicle suspension system controller cooperating with said four wheel system controller for (1) selecting one of the steering properties over the other and controlling said rear wheel steering mechanism based on said one of the steering properties, (2) computing a lateral acceleration of the vehicle, (3) judging if said lateral acceleration is in a particular range, (4) setting said desired roll displacement to a non-zero value if said lateral acceleration is in said particular range, (5) setting said desired roll displacement to a value of zero if said lateral acceleration is not in said particular range, and (6) performing roll control in accordance with said sporty roll control mode, if said sporty roll control mode is selected by said manual switch; and (1) setting said desired roll displacement to a value of zero, and (2) selecting the other of the steering properties and controlling said rear wheel steering mechanism based on the other of the steering properties, if said normal roll control mode is selected by said manual switch.

2. A control system for a vehicle comprising:
means for providing a supply of hydraulic fluid;
a plurality of hydraulic cylinders, each of said hydraulic cylinders provided between a vehicle body and one of a plurality of vehicle wheels;
proportional flow control valves for controlling the supply of hydraulic fluid to each of the hydraulic cylinders;
a vehicle suspension system controller for controlling said proportional flow control valves in accordance with a desired roll displacement;
a manual switch for selecting one of a normal roll control mode, in which said desired roll displacement value is zero, and a sporty roll control mode, in which said desired roll displacement value is not necessarily zero;
a rear wheel steering mechanism for steering right and left rear vehicle wheels; and
control means for selecting one of a stronger phase steering property and a weaker phase steering property and controlling said rear wheel steering mechanism based on one of the steering properties;
said vehicle suspension system controller cooperating with said control means for (1) selecting one of the steering properties over the other and controlling said rear wheel steering mechanism based on said one of the steering properties, (2) computing a lateral acceleration of the vehicle, (3) judging if said lateral acceleration is in a particular range, (4) setting said desired roll displacement to a non-zero value is said lateral acceleration is in said particular range, (5) setting said desired roll displacement to a value of zero is said lateral acceleration is not in said particular range, and (6) performing roll control in accordance with said sporty roll control mode, if said sporty roll control mode is selected by said manual switch; and (1) setting said desired roll displacement to a value of zero, and (2) selecting the other of the steering properties and controlling said rear wheel steering mechanism based on the other of the steering properties, if said normal roll control mode is selected by said manual switch.

3. A control system as recited in claim 1, wherein the rear vehicle wheels are provided with a reverse phase steering property, in which the rear vehicle wheels begin to be steered in a direction opposite to front vehicle wheels at a relatively low vehicle speed, when the vehicle is rolled beyond a horizontal attitude in a direction opposite to a direction of natural rolling produced during cornering.

4. A control system as recited in claim 1, wherein the rear vehicle wheels are provided with a same phase steering property, in which the rear vehicle wheels begin to be steered in a direction which is the same as front vehicle wheels at a relatively high vehicle speed, when the vehicle is rolled beyond a horizontal attitude in a direction opposite to a direction of natural rolling produced during cornering.

5. A control system as recited in claim 1, wherein the rear vehicle wheels are provided with a reverse phase steering property, in which the rear vehicle wheels begin to be steered in a direction opposite to front vehicle wheels at a relatively low vehicle speed, when the vehicle is rolled up to a horizontal attitude of the vehicle in a direction opposite to a direction of natural rolling produced during cornering.

6. A control system as recited in claim 1, wherein the rear vehicle wheels are provided with a same phase steering property, in which the rear vehicle wheels begin to be steered in a direction which is the same as front vehicle wheels at a relatively high vehicle speed, when the vehicle is rolled up to a horizontal attitude in a direction opposite to a direction of natural rolling produced during cornering.

7. A control system as recited in claim 1, wherein the desired roll displacement value is not zero when a lateral acceleration acting on the vehicle ranges from 0.1 to 0.3 g.

* * * * *